Jan. 8, 1946.  E. SEPPELER  2,392,556
ADJUSTING PITCH OF SCREWS
Filed Jan. 30, 1940  2 Sheets-Sheet 1
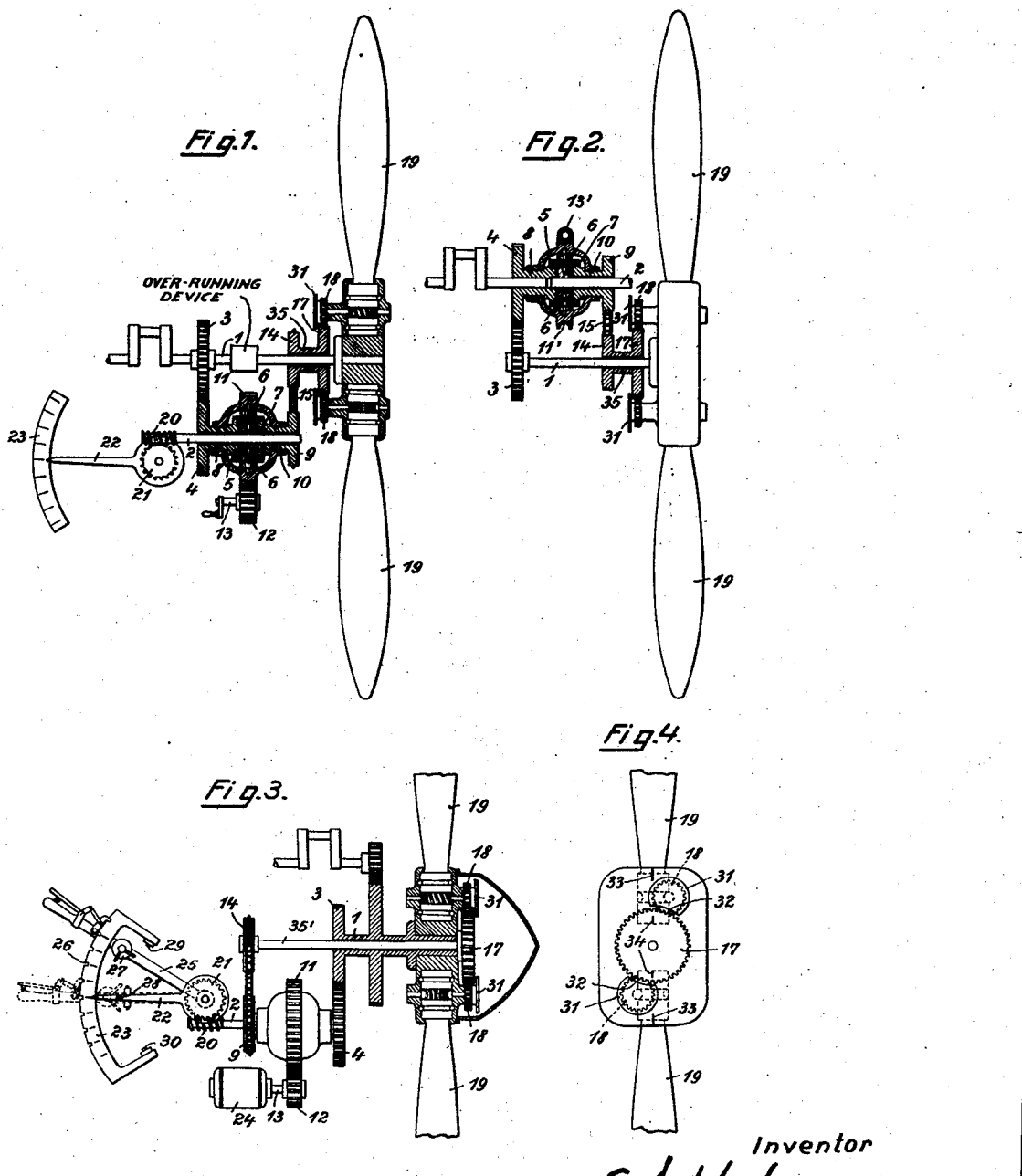

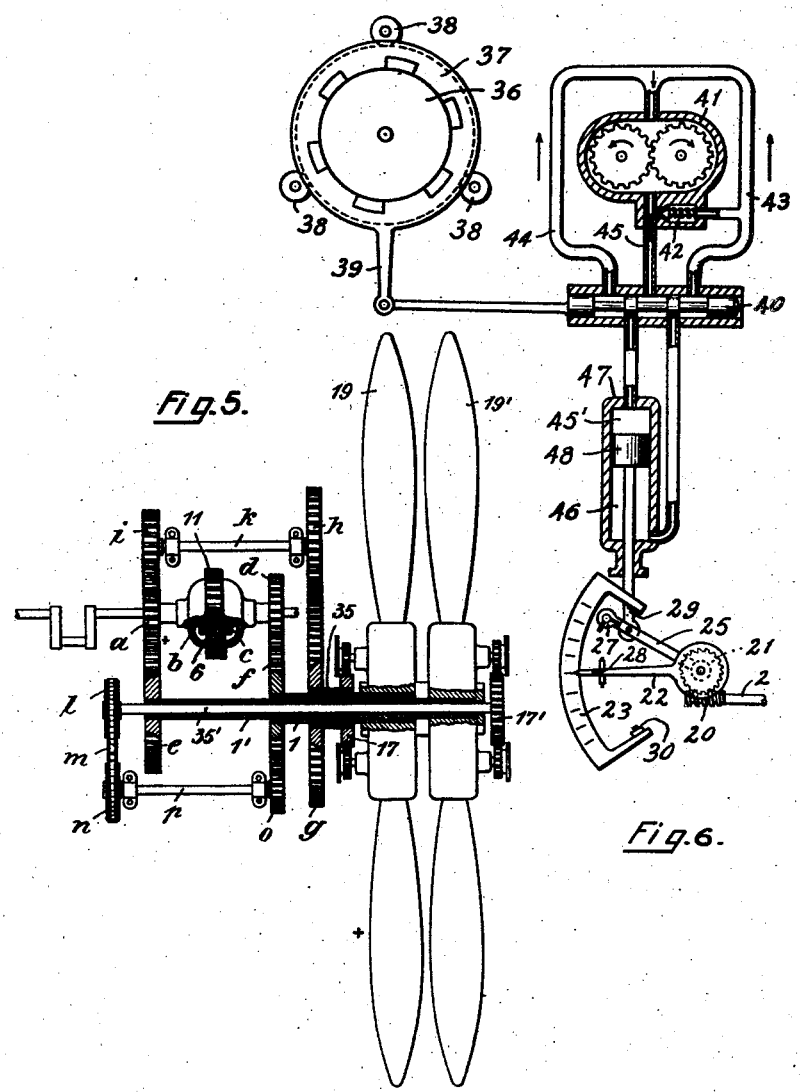

Patented Jan. 8, 1946

2,392,556

UNITED STATES PATENT OFFICE 2,392,556

ADJUSTING PITCH OF SCREWS

Eduard Seppeler, Berlin-Buckow-Ost, Germany; vested in the Alien Property Custodian Application January 30, 1940, Serial No. 316,437
In Germany February 16, 1939

7 Claims. (Cl. 170—135.6)

This invention relates to improvements in mechanism for adjusting the pitch of the blades of an air or water screw propeller, whether the propeller be running or at rest, and for indicating the pitch, the said mechanism providing also for automatic adjustment of the blades to a predetermined position.

More particularly the invention relates to mechanism for this purpose including a differential gear having one sun wheel rotating with the propeller driving shaft and another sun wheel normally rotating with the propeller but capable of adjustment with respect to it by movement of the planet pinion carrier of the differential gear, such adjustment of the second mentioned sun wheel relatively to the propeller being utilised to vary the pitch of the propeller blades.

It is a principal feature of the present invention that the differential gear of the pitch adjusting mechanism is arranged not upon the propeller shaft but upon a lay shaft, its first sun wheel being driven from the propeller driving shaft, and its second sun wheel operating the pitch adjusting gear through a reversing gear. By this arrangement it is possible to reduce the tooth speeds of the gear wheels, and to construct the mechanism compactly so that it may be included in the housing of the engine by which the propeller is driven. The arrangement has also the advantages of permitting convenient installation of a pitch indicator, and of automatic pitch-adjusting means, as well as enabling adjustment of the blade pitch of two oppositely rotating propellers.

Examples of construction of the invention are shown diagrammatically in the accompanying drawings.

Figure 1 shows a propeller mounted on the engine shaft, with the differential gear of the pitch adjusting mechanism upon a lay shaft.

Figure 2 shows the propeller on a lay shaft and the differential gear upon the engine shaft.

Figure 3 shows the propeller on a lay shaft and the differential gear on another lay shaft.

Figure 4 shows a detail of the pitch-adjusting mechanism for removable propellers.

Figure 5 shows the invention applied to a pair of oppositely running propellers.

Figure 6 is an elevation of one form of automatic means for controlling the position of the pitch-setting lever.

In Figure 1 a gear wheel 3 is keyed on the engine shaft meshes with the gear wheel 4 by which the differential gear is driven. The differential gear shown is of the bevel pinion type, comprising sun wheels 5 and 7 with both of which mesh one or more planet pinions 6. This differential gear is mounted on a lay shaft 2, the sun wheel 5 and gear wheel 4 being keyed on a sleeve 8 turning on the lay shaft 2, while the sun wheel 7 and a sprocket wheel 9 are keyed on another such sleeve 10. The planet pinion carrier is fast on the shaft 2, and in addition to carrying a radial spindle for the corresponding planet pinion, or each of the planet pinions, the carrier has gear teeth 11 on its periphery. In Figures 1 and 3 the teeth 11 are spur teeth in mesh with a pinion 12 on a control shaft 13 which may be turned by hand or power to rotate the planet carrier and the shaft 2. In Figure 2 the teeth on the periphery of the planet carrier are worm teeth, and the carrier is turned by a worm shaft 13'.

The propeller blades 19 are mounted to rotate in the hub of the propeller, and are interconnected by gearing so that they all turn simultaneously and to the same extent. In Figures 1 and 3 the pitch-adjusting gearing is shown as comprising a worm gear on the root of each blade, with which engages a worm shaft mounted in the propeller hub and carrying at its end a pinion 18. All of the pinions 18 mesh with the same pitch-controlling gear wheel 17. In Figs. 1 and 2 this pitch control gear wheel is keyed on a sleeve on the propeller shaft 1, and on the same sleeve is keyed a wheel 14 driven from the sprocket wheel 9.

Since the sprocket wheel 9 rotates in the opposite direction to the gear wheel 4, and since the gear 14 is required to rotate normally in the same direction as the gear wheel 3, an idle pinion or other means of reversing the direction of rotation must be included in the drive between 9 and 14 so that these two may rotate in the same direction. In Figures 1 and 3 these wheels are shown as sprockets connected by a chain 15.

The pitch adjusting mechanism works as follows. So long as the control spindle 13 is at rest the planet carrier does not turn, and the planet wheels 6 turn only on their axes. The gear ratio of 3 and 4 being the same as that of 14 and 9, the wheel 14 in the same direction and at the same speed as the wheel 3, that is at the speed of the screw propeller. Hence the pinions 18 have a planet motion only and do not turn on their axes, and the pitch of the blades remains unchanged. When, by turning the control spindle 13, the planet pinion carrier is rotated in either direction the sun wheel 7 is turned relatively to the sun wheel 5 in the same direction as the planet carrier and through twice the angle; and the wheel 14 is similarly turned relatively to the wheel 3. These actions take place whether the engine and propeller are running or not. Thus all the pinions 18 and all the blades 19 are turned by the same amount corresponding to the extent that the control spindle is turned.

In the construction of Figure 3 the pitch-control wheel 17 and the pinions 18 are placed on the forward side of the propeller, and the hollow propeller shaft 1 is driven by gearing from the engine crank shaft. The gear wheel 3 is on the hollow propeller shaft and drives the gearwheel 4 of the differential gear 4 which is mounted on the lay shaft 2. This arrangement makes it possible to reduce the overall length of engine, screw propeller, and pitch-adjusting mechanism and makes for compactness. The propeller can be brought close up to the engine, and the tooth speeds in the pitch-adjusting mechanism can be reduced.

The shaft 2 of the differential gear upon which the planet pinion carrier is keyed, includes a worm 20 by which the motion of the planet pinion carrier is imparted through the worm wheel 21 to an indicator pointer 22 moving over a scale 23. By this means an indication of the pitch angle of the blades is constantly given.

In Figure 1 the control spindle 13 is shown as rotatable by hand by means of a crank handle. Alternatively it may be turned by a motor 24 as indicated in Figure 3. When a motor is employed the indicator 22, 23 may be modified to bring about automatic adjustment of the blades to a predetermined pitch angle. For this purpose a pre-selecting switch lever 25 is provided which can be set in any desired position along the scale 23, being retained where set by a spring pawl engaging notches 26 in the edge of the scale. The switch lever carries a tilting switch 27 which controls the motor 24, the motor being set in motion in one direction or the other according as the switch is moved to one or another of its extreme positions, and the motor circuit being broken when the switch is in its intermediate position. On the pointer 22 is an abutment 28 located to engage and operate the tilting switch 27. When the pointer 22 is aligned with the switch lever 25, as shown in Figure 3, the switch 27 is in its intermediate position and the motor 24 is at rest. If the switch lever is moved from this position in one direction or the other to pre-select a different pitch setting for the propeller blades 19, the abutment 28 throws over the switch 27 and starts the motor 24 in the direction needed to cause the pointer 22 to follow the switch lever 25. The motor continues running until the pointer 22 becomes realigned with the switch lever, so that the abutment 28 returns the switch 27 to the intermediate or open position.

By the means described any pitch angle of the blades may be pre-selected, from the extreme setting for gliding, through all possible driving settings to the opposite extreme setting for braking, and the corresponding adjustment of the blades will automatically follow. This is particularly of value for giving the blades negative pitch for braking purposes.

This device may also be employed as part of the control apparatus for automatically controlled propellers, for instance for propellers which are automatically maintained at a constant speed of rotation because it responds instantly to small departures from the desired conditions and prevents over regulation. For example the lever 25 may be connected with the propeller regulator so as to be moved by it, and the tilting switch 27 may be designed for any desired degree of sensitiveness of regulation.

End contacts 29 and 30 upon the scale 23 may co-operate with contacts on the pointer 22 to bring about interruption of the circuit established by the switch 27.

Since it is commonly desirable that the blades 19 shall be removable for replacement, and also that the whole propeller shall be removable for replacement, it is necessary to ensure that a new blade or new propeller can only be mounted in the position which the indicator 22, 23 purports to show. Locking means are provided to prevent the blade or propeller being mounted in any other position than that indicated. For example, for the purpose of fine adjustment the pinions 18 on the propeller hub may carry discs 31, partly cut away as shown at 32 in Figure 4, so that the propeller can be put in position only when the cut away parts 32 register with the gear wheel 17. This, however, does not alone ensure unique correspondence between the setting of the blades 19 and the position of the wheel 17 and the indicator 22, 23. Approximate correspondence, or coarse adjustment, is therefore first secured by bringing into alignment setting marks 33, 34, upon the propeller hub and the wheel 17 respectively.

The drawings show the gears 3 and 4, and 14 and 9 as having approximately a 1-1 ratio; a different ratio may be chosen when it is desired to make the tooth speeds of the planet pinions 6 specially small.

The pitch-adjusting gear wheel 17 has to be either on a sleeve 35 rotatable on the propeller shaft as shown in Figures 1 and 2, or on a spindle 35' passing through a hollow propeller shaft as shown in Figure 3.

A combination of these two arrangements adapts the pitch mechanism to the control of two co-axial oppositely rotating propellers. This is shown in Figure 5, where a single differential gear serves both propellers. Such parts of Figure 5 as clearly correspond with parts of Figures 1 to 3 are indicated by the same reference numerals. Where such correspondence is lacking, reference letters are employed. The propeller next the engine whose blades are indicated by 19 has its pitch-controlling gear wheel 17 on a sleeve 35 surrounding the hollow shaft 1 of that propeller. The forward propeller blades are indicated by 19' and their pitch adjusting wheel by 17', the latter being fixed on a spindle 35' passing through the hollow propeller shaft 1'. On the engine shaft is keyed spur wheel $a$ having a sleeve connecting it with the adjacent sun wheel $b$ of the differential gear. The planet pinions 6 mesh with the sun wheel $b$ and the sun wheel $c$, and the latter is on a sleeve which also bears the spur wheel $d$. The spur wheel $a$ bears a spur wheel $e$ keyed on the shaft 1' of the forward propeller, while the spur wheel $d$ drives the spur wheel $f$ keyed on the shaft 1 of the rear propeller. On the sleeve 35 which carries the pitch-controlling wheel 17 for the blades 19 of the rear propeller there is also keyed a spur wheel $g$, which is operatively connected with the spur wheel $a$ by gear wheels $h$ and $i$ keyed on the shaft $k$. On the sleeve 35' which bears the pitch controlling wheel 17' there is also keyed a sprocket wheel $l$; which is connected by a chain $m$ with the sprocket wheel $n$ on shaft $p$, on which is also keyed a spur wheel $o$ meshing with the spur wheel $f$ on the propeller shaft 1.

As in Figure 1 the planet pinion carrier includes a ring of spur teeth 11, meshing with a pinion on the control spindle. In order to avoid complication of Figure 5, neither the control spindle nor the indicator are shown. However, it will be understood that their construction can be as already shown in Figure 3.

The teeth pressures exerted on the planet pinions 6 by the sun wheels of the differential gear tend to turn the planet pinions in the same direction about the axis of the gear. This pressure may be utilised to turn the pitch-adjusting mechanism quickly upon the disengagement of the pinion on the control spindle from the teeth 11. If the extent of rotation is suitably limited in each direction, e. g., at the position for gliding and braking, the power of the engine may be brought to bear to bring the blades rapidly to braking position as soon as the teeth 11 are disengaged. Similarly by throttling down the engine the momentum of the propellers overrunning the engine will turn the planet pinion carrier in the opposite direction and bring the blades to gliding position. Provision for such free-wheeling or overrunning can be made as shown diagrammatically in Figure 1 of the drawings, wherein the overrunning device is incorporated in the shaft 1 between the gear wheels 3 and 14, and may be similarly effectively incorporated in the arrangements shown in other figures of the drawings. Such an overrunning device will confine the overrunning to one direction, and therefore confines the feathering of the propeller blades to a corresponding direction. Thus either the engine or the rotating propeller yields the considerable energy needed to adjust the blades quickly to braking or gliding position. When the engine stops the blades will automatically set themselves in gliding position if the teeth 11 are disengaged from the pinion on the control spindle, so thereby relieving the pilot of a multi-engine aircraft from this task.

It is preferable that the teeth 11 should remain in mesh with the pinion on the control spindle, and that disengagement for the above purpose be effected by the operation of the described free-wheeling or overrunning device.

The mechanism may be so designed that the tooth pressures providing power for the described adjustment act in the opposite direction to that above described. Referring to Figure 6 of the drawings, the adjusting drive may be controlled from a control means which, by changing the blade pitch, keeps the propeller drive at a constant R. P. M. To this end, use is made, for example, of an electrical regulating means as described in my application Serial No. 209,675. The primary portion 36 is coupled to the propeller axis. The secondary portion 37 is oscillably journalled between rollers 38 and carries a control arm 39 which actuates a piston 40. A gear oil pump 41 with a high pressure valve 42 produces a suction in the conduits 43 and 44 and a pressure in the conduit 45. In accordance with the position of the piston 40, the oil is forced either into the chamber 45' or the chamber 46 of the cylinder 47. As a result the piston 48 is moved whereby it actuates the lever 25 of the control device shown in Figure 3. A departure from Figure 3 is found only in the fact that lever 25 is provided with no handle and that the scale carrier 23 is in consequence not provided with holders for fixing the position of the lever 25.

I claim:

1. Pitch-adjusting and pitch indicating mechanism for a screw propeller having a shaft comprising pitch-adjusting gearing for each blade mounted upon and turning with the propeller, a pitch-controlling gear wheel operating the pitch-adjusting gearing of all blades rotatable upon the propeller shaft, a differential gearing interconnecting said pitch-adjusting gearing with the propeller shaft, including sun wheels respectively connected with said pitch-controlling gear wheel and said propeller shaft and a planet pinion interconnecting said sun wheels and mounted on a normally stationary planet pinion carrier, a motor for turning said planet pinion carrier to vary the pitch of the blades, a rotatable arm geared to said planet pinion carrier, a pitch setting lever co-operating with said arm, and switching means controlling said motor operated by relative movement of said arm and said lever out of and into a datum relative position.

2. Pitch adjusting and pitch indicating mechanism for a screw propeller having a shaft comprising a pitch-adjusting gearing for each blade mounted upon and turning with the propeller, a pitch-controlling gear wheel operating the pitch-adjusting gearing of all blades rotatable upon the propeller shaft, a differential gearing interconnecting said pitch-adjusting gearing with the propeller shaft, including sun wheels respectively connected with said pitch-controlling gear wheel and said propeller shaft and a planet pinion interconnecting said sun wheels and mounted on a normally stationary planet pinion carrier, a motor for turning said planet carrier to vary the pitch of the blades, a pitch setting lever co-operating with said arm, switching means controlling said motor operated by relative movement of said arm and said lever out of and into a datum relative position, and further switching means operated by said arm at the limits of its travel for putting said motor out of action irrespective of the relative position of said arm and said lever.

3. Pitch adjusting mechanism for a removable screw propeller having a shaft comprising pitch-adjusting gear for each blade mounted upon, turning with and removable with the propeller, a pitch-controlling gear wheel operating the pitch-adjusting gearing of all blades rotatable upon the propeller shaft, a differential gearing interconnecting said pitch-adjusting gearing with the propeller shaft, including sun wheels respectively connected with said pitch-controlling gear wheel and said propeller shaft and a planet pinion interconnecting said sun wheels and mounted on a normally stationary planet pinion carrier, means for turning said planet pinion carrier to vary the pitch of the blades, and means for preventing re-engagement of the pitch-adjusting gearing with the pitch-controlling gear wheel on replacement of the propeller except in one definite relative position.

4. Pitch adjusting mechanism for a screw propeller having a shaft comprising pitch-adjusting gearing for each blade mounted upon and turning with the propeller, a pitch-controlling gear wheel operating the pitch-adjusting gearing of all blades rotatable upon the propeller shaft, a differential gearing interconnecting said pitch-adjusting gearing with the propeller shaft, including sun wheels respectively connected with said pitch-controlling gear wheel and said propeller shaft and a planet pinion interconnecting said sun wheels and mounted on a normally stationary planet pinion carrier, a motor for turning said planet pinion carrier to vary the pitch of the blades, a rotatable arm geared to said planet pinion carrier, a pitch setting lever cooperating with said arm, switching means controlling said motor operated by relative movement of said arm and said lever out of and into a datum relative position, and automatic means dependent on the running conditions of said propeller controlling the position of said pitch setting lever.

5. A blade pitch adjusting mechanism for two coaxial oppositely rotating screw propellers comprising coaxial hollow shafts for said propellers, pitch-adjusting gearing for each blade mounted upon and turning with the propellers, a pitch-controlled gear wheel for each propeller for operating the pitch-adjusting gearing of all the blades of each propeller, a sleeve surrounding said coaxial shafts, one of said pitch-controlling gear wheels being fixed to said sleeve, a shaft extending through the interior of said coaxial shafts, the other of said pitch-controlling gear wheels being fixed upon said last mentioned shaft, a differential gear interconnecting said pitch-adjusting gears with their corresponding propeller shafts comprising two sun wheels, each of said sun wheels being connected with the shaft of one propeller and the pitch-controlling gear wheel of the other propeller, a planet pinion interconnecting said sun wheels and a normally stationary planet pinion carrier, and means for turning said planet pinion carrier in order to vary the pitch of said blades.

6. A blade pitch adjusting and pitch-indicating mechanism for a screw propeller comprising a propeller shaft, pitch-adjusting gearing for each blade mounted upon and turning with the propeller, a pitch-controlling gear wheel rotatable on the propeller shaft for operating said pitch-adjusting gearing for all the blades, a differential gearing, means interconnecting said pitch-adjusting gearing and said propeller shaft, unidirectional overrunning means in said propeller shaft between the last mentioned means and said pitch controlling gearwheel, said differential gearing comprising sun wheels operatively connected with said pitch-controlling gear wheel and with said propeller shaft, respectively, a planet pinion interconnecting said sun wheels and a normally stationary planet pinion carrier upon which said planet pinion is mounted, adjusting means normally holding said carrier stationary and being operable for turning said planet pinion carrier to vary the pitch of the blades and means for disengaging said adjusting means from said planet pinion carrier to permit the carrier to be turned by the momentum of the propeller or the power of the engine when either one overruns the other in one direction.

7. In a pitch adjusting mechanism for a screw propeller having axially rotatable blades, said propeller being fixed on a propeller shaft; a unidirectional overrunning device incorporated in said propeller shaft, a lay shaft alongside of the propeller shaft, a planetary differential gear including a pair of sunwheels, blade turning gear means operatively connected to the blades for changing their pitch and retaining the pitch thus obtained, said blade turning means comprising rotary means rotatable on and coaxial with the propeller shaft at one side of said overrunning device and operated relative to the propeller shaft from one of the sun wheels of said differential, an operative connection between the propeller shaft at the opposite side of said overrunning device and the remaining sun wheel of said differential, a driving engine operatively connected to one of the shafts, said planetary differential gear further comprising a relatively stationary housing mounted on said lay shaft and including planetary gears in mesh with the mentioned sun wheels, differential housing adjusting means including an adjustable element arranged to be operatively connected with said differential housing to hold the same stationary and for turning the housing to determine the pitch of the propeller blades, said adjusting means being disconnectible from the differential housing to permit the blades to be pitch-adjusted in one direction whenever the propeller or the engine overruns the other.

EDUARD SEPPELER.